United States Patent [19]
Huscroft et al.

[11] Patent Number: 5,568,486
[45] Date of Patent: Oct. 22, 1996

[54] INTEGRATED USER NETWORK INTERFACE DEVICE

[75] Inventors: Charles K. Huscroft; David W. Wong, both of Coquitlam; Steven F. Lang, Vancouver; Vernon R. Little, Belcarra, all of Canada

[73] Assignee: PMC-Sierra, Inc., Burnaby, Canada

[21] Appl. No.: 250,895

[22] Filed: May 31, 1994

[51] Int. Cl.⁶ .................................................. H04J 3/07
[52] U.S. Cl. ................................................... 370/94.2
[58] Field of Search ...................................... 370/102, 108, 370/61, 68, 82, 84, 91, 94.2, 112, 105.1, 60, 60.1, 99

[56] References Cited

U.S. PATENT DOCUMENTS

| | | | |
|---|---|---|---|
| 5,170,272 | 12/1992 | Onno | 370/91 |
| 5,239,544 | 8/1993 | Balzano et al. | 370/94.2 |
| 5,274,635 | 12/1993 | Rahman et al. | 370/102 |
| 5,309,438 | 5/1994 | Nakajima | 370/108 |
| 5,384,774 | 1/1995 | Martin et al. | 370/102 |

OTHER PUBLICATIONS

Robe et al, "A Sonet STS-3c User Network Interface Integrated Circuit", 1991, pp. 732–740.
Lalk et al, "Highly Integrated ATM/Sonet User–Network Interface" 1991, pp. 2174–2176.

*Primary Examiner*—Wellington Chin
*Assistant Examiner*—Huy D. Vu
*Attorney, Agent, or Firm*—Anderson, Levine & Lintel

[57] ABSTRACT

A method of interfacing between a non-continuous stream of cells of data and a continuous stream of frames of data, which includes transforming an incoming non-continuous cell stream into a continuous transmitted stream by inserting idle or non-assigned cells into the data stream during idle periods. The cells in the continuous stream are then mapped sequentially and contiguously onto the payload portions of frames. The frames are then transmitted synchronously.

18 Claims, 6 Drawing Sheets

ATM Cell Structure

FIG. 1

SONET STS-3c Frame Structure

INTEGRATED USER NETWORK INTERFACE DEVICE

FIELD

The present invention relates to an interface between synchronous optical network (SONET)/synchronous digital hierarchy (SDT) STS-3c, which is a digital transmission standard that defines a new digital hierarchy for fiber optic transmission and a frame structure for multiplexing digital traffic, and asynchronous transfer mode (ATM). ATM is a new payload multiplexing technique which segments payload into 53-byte cells which can be allocated to user channels based on demand.

BACKGROUND

The advent of applications such as network computing, multimedia, video conferencing, and real-time imaging require data rates ranging into the gigabits-per-second. The demand for such high rates has led the industry to combine a standardized wide band network (SONET) with the simplicity of an efficient network that uses fixed-length 53-byte-wide asynchronous transfer-mode (ATM) cells. In 1992 ATM was chosen by the CCITT (Consultative Committee for International Telephony and Telegraphy) as the transport technology for the huge variety of services to be offered by the Broadband Integrated Services Digital Network (B-ISDN). However, it has been recognized that ATM is equally well-suited for use in the local area network. An ATM cell consists of 53 octets or bytes with a 5 byte cell header containing control bits and a 48 octet or byte cell payload which contains the data bits. In order to interface with a standardized wide band network such as Synchronous Optical Network (SONET) appropriate interfaces to transfer from one system to the other are required.

In order to integrate all of the functions of a SONET/SDH-3c ATM physical layer interface into a single device and at the same time be applicable to local and wide area networking applications a number of criterion have to be met. First one requires a fully compliant SONET/SDH framer. Here the term SDH refers to CCITT's synchronous digital hierarchy and STS-3c refers to a data transmission rate of 155.52 megabits-per-second (Mbits/s). Being a multiple of 3 times the STS-1 base rate of 51.84 Mbits/s in accordance with the SONET family of interface rates. The SONET STS-3c frame structure consists of 9 rows of bytes with each row having 9 bytes of transport overhead and 261 columns of 9 bytes each with one of the columns having control bits defining path overhead while the remaining columns are payload. The framer takes ATM cells and puts them into a synchronous series of SONET FRAMES.

A second requirement of an interface device is an ATM cell processor to perform cell delineation and null cell insertion/filtering. Since many of the services delivered by ATM are by definition asynchronous, they are characterized by a non-continuous cell stream. Thus, cell rate decoupling transforms a non-continuous cell stream into a continuous stream by inserting idle or null cells (cells containing no payload) during idle periods in the assigned cell stream. By making the cell rate continuous, it is necessary only to synchronize with the incoming cells in order to place the ATM cells in their assigned locations in a frame.

The conventional system of processing data byte-by-byte leads to long waiting times in order to transfer a whole cell. This is particularly important when multiple sources of ATM signals are being received. For example, the receiving system would be tied up waiting for all bytes from a given cell to arrive, even though bytes from other cells were also arriving. It is important for a user network interface to overcome such inefficiencies.

A third requirement is a line side interface to support both serial input/output at 155 Mbits/s and parallel input/output at 19.44 Mbyte/s. The receive interface portion of the line side interface must be a low speed generic byte wide interface for interconnection with an upstream serial-to-parallel converter, or with an upstream byte interleaved demultiplexer. When operating with a serial to parallel converter, the interface must provide scrambled data and a 19.44 MHz clock. When operating with the byte interleaved multiplexer, the transmit interface provides an STS-3c/STM-1 stream which is multiplexed to a higher rate stream such as an STS-12/STM-4. In the latter case no scrambling of the data takes place.

Finally, there must be an overhead expansion port to access all SONET/SDH overhead bytes to allow external processing for full SONET/SDH network-network interface (NNI) compliance. By allowing external monitoring and/or control of the overhead bytes additional SONET/SDH features can be implemented externally when required for specific applications.

For SONET/SDH systems, prior solutions had to be implemented with multiple devices or with discrete logic. One known SONET ATM interface device implemented a subset of the SONET/SDH protocol sufficient for demonstration purposes but not for use in actual commercial applications. It did not incorporate cell delineation or a drop side FIFO based interface supporting cell rate decoupling or provide an overhead expansion port to allow feature set enhancement.

SUMMARY OF THE INVENTION

According to the invention there is provided a method of interfacing between a asynchronous stream of cells of data and a synchronous stream of frames of data, which includes transforming an incoming asynchronous cell stream into a synchronous transmitted stream by inserting idle or non-assigned cells into the data stream during idle periods. The cells in the synchronous stream are then mapped sequentially and contiguously onto the payload portions of frames. The frames are then transmitted synchronously. The method of interfacing further includes transforming an incoming synchronous stream of frames of data into an asynchronous stream of cells of said data by performing frame synchronization, overhead processing and monitoring upon incoming frames of data. The method further includes cell delineation, transferring delineated cells to a receive FIFO and accessing the receive FIFO to read out cells stored therein.

Cells may be temporarily stored in a first-in first-out buffer before being mapped into the payload portions of the frames.

Cells may be read out from the buffer and idle cells inserted when no complete cells have been written into the buffer so as to produce a continuous stream of cells.

Conventionally, when time sharing with multiple physical devices, cells are processed on a byte-by-byte basis which requires the receiving circuit to wait until all of the intermittently arriving bytes for a cell have been received before accepting bytes from any other sources. The present system overcomes the foregoing inefficiencies by basing the receiving and transmitting of information on a cell basis rather than on a byte basis.

Preferably the buffer has a four cell capacity. The cells arriving to the device are transmitted in an asynchronous transfer mode and are mapped onto a synchronous optical network. Use of such a buffer allows decoupling of the cell arrival rate from the cell transmission rate out the buffer.

The method may include delineating incoming frames, examining cell header patterns to determine if a given cell is idle and discarding idle cells.

The method may further include transforming an incoming synchronous stream of frames of data into a asynchronous outgoing stream of cells of data by delineating and extracting cells from the frames and buffering and transmitting the cells asynchronously.

The synchronous stream of incoming and outgoing transmitted frames may be on a synchronous optical network and the incoming cell stream and the outgoing transmitted stream of cells in a synchronous transfer mode.

In another aspect of the invention there is provided a user network interface device for interfacing between a non-continuous stream of cells of data and a continuous stream of frames of data which includes means for temporarily storing received cells in a first-in first-out buffer, means for reading out cells from the buffer on a cell-by-cell basis, means for generating and inserting idle cells into the cell stream of cells being read out when no complete cells have been written into the first-in first-out buffer during idle periods of the cell stream, means for mapping cells from the storing means into the payload envelope of frames of data and means for synchronously transmitting the frames of data.

The idle cell generating and inserting means may include an idle cell generator, registers programmed to insert header fields for the idle cell header and payload and means for calculating and inserting the header check sequence for an idle cell.

The network user interface device may have a transmitting section and a receiving section, wherein the receiving section may include means for receiving synchronous incoming frames, means for extracting the synchronous payload envelope and transport and path overhead from the frames, means for delineating cell boundaries of cells from the synchronous payload envelope, means for filtering out idle cells from said cells and directing non-idle cells to a receive first-in first-out buffer, and means for reading out cells from the receive FIFO buffer in response to requests from an external circuit.

In yet another aspect of the invention there is provided a device for performing cell delineation in an interface between a continuous transmission rate of frames of data containing ATM cells and a non-continuous transmission rate of ATM cells which includes means for performing header check sequence calculations on possible cell boundaries in a "Hunt" state to determine valid cell 5 boundary locations, means for comparing header check sequence values calculated for DELTA cells in sequence with that for a valid cell boundary location, means for returning to the "Hunt" state if an incorrect header check sequence value is calculated within the next DELTA cells, and means for entering a synchronization state if no incorrect header check sequence patterns are detected within the DELTA cells. Means are provided for computing header check sequences on successive cells until ALPHA consecutive incorrect header check sequence values are detected and then returning to the "Hunt" state.

Advantageously, DELTA is 6 and ALPHA is 7.

In a further aspect of the invention there is provided a method of cell delineation in an interface between an non-continuous transmission rate of cells of data and a continuous transmission rate of frames of data containing the cells which includes performing header check sequence calculations on possible cell boundaries from potential cells extracted from a synchronous payload envelope of received frames of data in a "Hunt" state to determine a valid cell boundary location, comparing header check sequence values calculated for DELTA subsequent cells with that for a valid cell boundary location, returning to the "Hunt" state if an incorrect header check sequence is received within the next DELTA cells, entering a synchronization state if no incorrect header check sequence patterns are detected within the next DELTA cells, computing header check sequences on successive cells until ALPHA consecutive incorrect header check sequence values are detected, and returning to the "Hunt" state if ALPHA consecutive incorrect header check sequence patterns are detected.

The transmitting section may further include a transport overhead access port coupled to a transmit line overhead processor operative to optionally insert into frames of cells to be transmitted bytes of transmit transport overhead from a data stream of such data. The receiving section may include a receive overhead access port coupled to a receive line overhead processor, the processor being operative to extract received transport overhead, serialize the extracted overhead data and make it available for outputting in response to appropriate control signals.

A path overhead access port may be coupled to a transmit path overhead processor and be operative to optionally insert into frames of cells to be transmitted bytes of transmit path overhead from a data stream of such data and the receive overhead access port may be operative to extract from frames of incoming data path overhead data and having means for serially transmitting such data to an external circuit.

The transmit interface may include a byte wide interface for interconnnection with a downstream parallel-to-serial converter and a downstream byte interleaved multiplexer. The receive interface may be byte wide and adapted for interconnection with an upstream serial to parallel converter, or with an upstream byte interleaved demultiplexer.

In yet a further aspect of the invention there may be provided a method of interfacing between a plurality of non-continuous streams of cells of data and a continuous stream of frames of data which includes transforming a plurality of non-continuous incoming cell streams into continuous outgoing ones by inserting idle or non-assigned cells into the data streams during idle periods, mapping predetermined numbers of sequentially arriving cells onto the payload portions of frames, transmitting the frames synchronously, and multiplexing the transmitted frames into a single stream of such frames.

An incoming continuous stream of frames of data may be transformed into a plurality of streams of such data. The continuous streams of such data may then be transformed into non-continuous outgoing streams of cells of data by delineating and extracting cells from the frames and buffering and transmitting the cells asynchronously.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
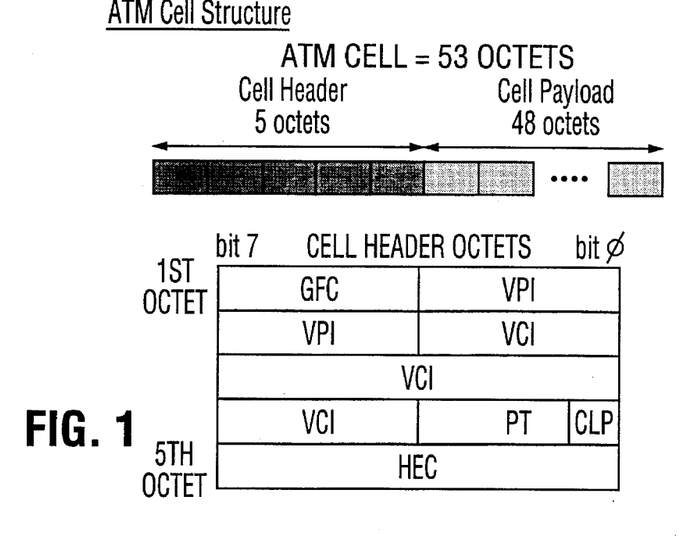
FIG. 1 is a schematic diagram of the ATM Cell structure.
Figure 2:
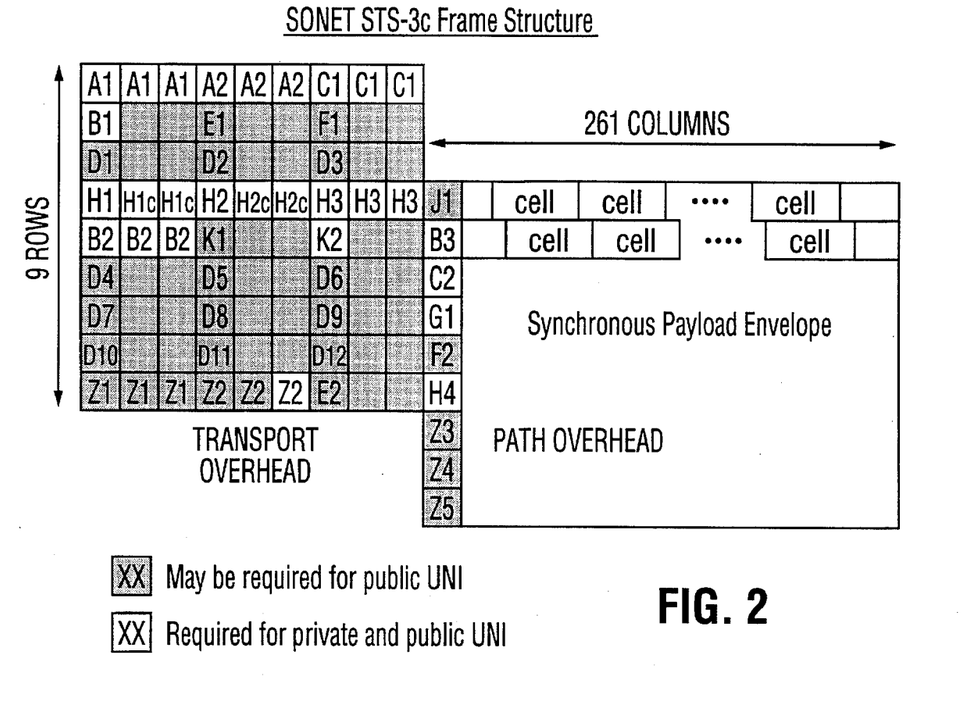
FIG. 2 is a schematic diagram of a SONET STS-3c frame structure.

Referring to FIG. 1 there is shown an ATM cell structure which consists of 53 octets or bytes. A cell header 11 has 5 octets and the cell payload has 48 octets. The cell header fields are shown in FIG. 2. The GFC consists of four bits which contain generic flow control field and are used for traffic flow control of the user network interface (UNI). The VPI/VCI fields consist of 24 bits containing the virtual path/virtual channel identification. These fields are used for routing a cell through a private or public ATM network. The PT field consists of three bits indicating the payload type carried by the cell. The eight values represented by this field are used to indicate the cell user data type, and management information. The CLP field contains one bit which allows the user or the network to set the loss priority of the cell. This bit is set for cells that may be discarded by the network. The field HEC called the header error control octet is used by the physical layer for cell delineation. It is also used for detection and correction of bit errors in the cell header. This octet or byte is also referred to as the header check sequence (HCS).

Referring to FIG. 2 there is shown the frame structure for a SONET STS-3c transmission format. In North America, the SONET standard (ANSI T1.105) was initially released in 1988, and describes a family of rates based on multiples of the 51,84 Mbit/s STS-1 signal. The commonly defined interfaces and their associated rates are listed below:

| Interface | Rate (Mbit/s) |
| --- | --- |
| STS-1 | 51.84 |
| STS-3/STS-3c | 155.52 |
| STS-12/STS-12c | 622.08 |
| STS-48 | 2488.32 |

Referring to FIG. 2 there is shown the SONET STS-3c frame structure which consists of 9 rows by 9 columns of transport overhead byte positions, one column of 9 bytes of path overhead and 260 columns of synchronous payload envelope in which ATM cells are placed horizontally and contiguously. Not all of the bytes in the transport overhead are filled. Some of the more important fields are A1 and A2 which specify the frame alignment pattern. In its transmit mode the device 10 inserts the frame alignment pattern (F6F6F6282828H) where the capital letters are the well-known hexidecimal symbols. In the receive mode the device 10 searches the data stream for the SONET frame alignment pattern. When the pattern has been detected for two consecutive frames, the device declares in-frame. When errors are detected in the pattern for four consecutive frames, the device declares out-of-frame.

Field B1 is the Section Bit Interleaved Parity which contains an 8-bit interleaved parity calculated across the entire SONET frame of 2430 bytes. The B1 value is calculated based on even parity, and the value inserted in the current frame is the parity value calculated for the previous frame.

H1, H2, H3 are the payload pointer which, in the transmit direction, may be fixed and in the receive direction is interpreted to locate the J1 byte which represents the first byte of the synchronous payload envelope (SPE). It is used to accommodate the jitter and wander that accumulates in all transmission systems. Pointer movements cause the SPE to move within the SONET frame 3 bytes at a time.

The field B3 is a path 8-bit interleaved parity calculated across the entire synchronous payload envelope.

The field H4 is the ATM Cell Offset which in the transmit direction indicates the offset in bytes to the next ATM cell boundary in the transmit stream. The byte can be used to delineate cell boundaries in the receive stream. However, cell delineation techniques that use the HEC octet are preferred.

Figure 3:
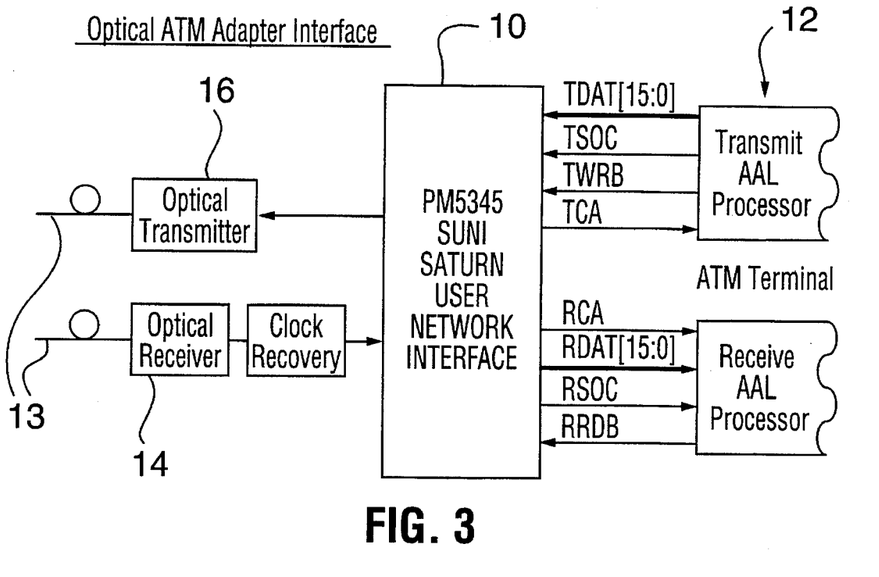
FIG. 3 is a schematic diagram of an application of the user network interface device coupling an optical line system with an ATM Terminal.
Figure 4:
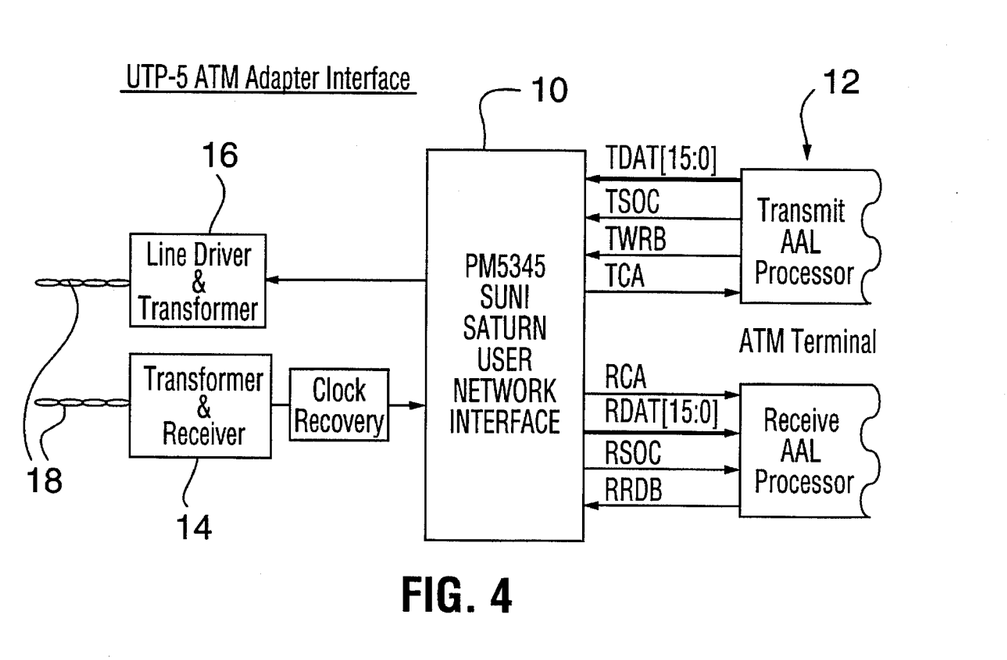
FIG. 4 is a schematic diagram of the circuit of FIG. 1 but with a twisted pair line system rather than a fibre optic one.

Referring to FIG. 3, the user network interface device 10 is fabricated as a monolithic integrated circuit that implements the SONET/SDH processing and ATM mapping functions of a 155 Mbit/s STS-3c user-network-interface. As shown, the device 10 couples a fibre optic line system 13 with an ATM terminal 12. On the line side an optical receiver 14 receives light signals generated by a remote laser (not shown) and converts them to electrical signals in SONET/SDH frames. The frames are processed by the device 10 which then transmits to the ATM Terminal 12 in the form of ATM cells. It recovers the 155.52 Mbit/s clock signal from the received frames and uses this clock to transmit to the optical transmitter 16. ATM cells received by the device 10 are processed and placed in transmitter 16. FIG. 4 shows a similar arrangement except that twisted pairs 18 rather than fibre optic lines 13 are used.

Figure 5:
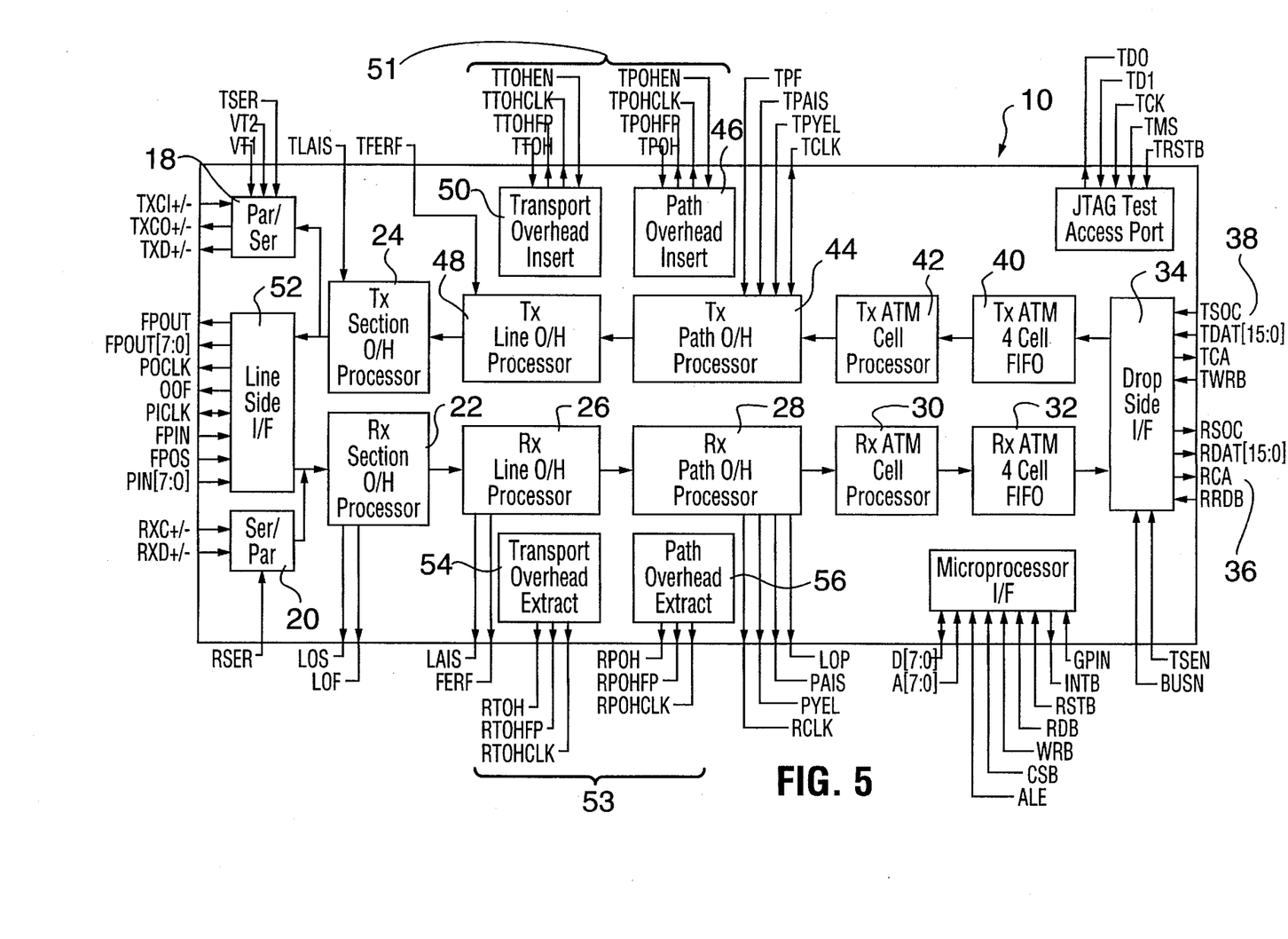
FIG. 5 is a schematic diagram of the user-network-interface device.

Referring to FIG. 5 there is shown the user network interface device 10 which consists of a parallel/serial transmit circuit 18 and a serial/parallel receive circuit 20. Transmit circuit 18 transmits SONET/SDH frames, via bit serial or byte serial signals and receive circuit 20 receives such frames in bit serial or byte serial format. Received bit serial signals are converted by the user network interface device 10 to byte serial format.

The output of the receive circuit 20 is coupled to the input of a receive section overhead processor 22 which provides frame synchronization, de-scrambling, section level alarm and performance monitoring. The output of the receive section overhead processor 22 is coupled to the input of a receive line overhead processor 26 which provides line level alarm and performance monitoring. The output of the line processor 26 is connected to the input of a receive path overhead processor 28 which provides pointer interpretation, extraction of path overhead, extraction of the synchronous payload envelope (SPE), and path level alarm and performance monitoring.

Once SONET/SDN overhead processing is complete the signals from the output of the receive path overhead processor 28 are directed to the input of a receive ATM cell processor 30. The ATM cell processor 30 performs ATM cell delineation, provides cell filtering based on idle/unassigned cell detection and HCS error detection, and performs ATM cell payload descrambling. The output of the receive ATM cell processor 30 couples to the input of a 4 cell deep receive FIFO 32 which passes data structures consisting of either 27 16-bit words, or 53 8-bit words and is used to separate the STS-3c line timing from the higher layer ATM system timing. The output of the FIFO couples to the input of a drop side interface 34.

The drop side interface 34 can be accessed through an external generic 16-bit or 8-bit wide interface. When a cell is available in the receive FIFO 32, external circuitry is notified using the RCA output signal 36 from the drop side interface 34. The external circuitry may then read the cell from the buffer as a word wide stream (along with a bit marking the first word of the cell) at instantaneous rates of up to 25 MHz.

Similarly, external circuitry is notified, using the TCA signal 38 from the drop side interface 34 when a cell may be written to the transmit FIFO 40 whose input is coupled to the output of the drop side interface 34. The cell is written to the FIFO 40 as a word wide stream (along with a bit marking the first word of the cell) at instantaneous rates of up to 25 MHz.

The transmit FIFO 40 provides FIFO management and the asynchronous interface between the device 10 and the external environment. The transmit FIFO 40 can accommodate four cells. It provides for the separation of the STS-3c line or physical layer timing from the ATM layer timing.

The FIFO supports two data structures. The first data structure consists of 27 16-bit words comprising the 5 octet cell header and the 48 octet payload (the Header Check Sequence {HCS} byte, along with the header error insertion control byte, is passed in this structure). The header error insertion control allows the programmable insertion of one or more bit errors in the HCS octet. The second data structure consists of 53 8-bit words, comprising the 5 octet cell header, and the 48 octet payload.

Management functions of the transmit FIFO 40 include filling the transmit FIFO 40, indicating when cells are available to be written to the transmit FIFO 40, maintaining transmit FIFO read and write pointers, and detecting a FIFO overrun condition. Upon detection of an overrun condition, the FIFO 40 is automatically reset. Up to four cells may be lost during the FIFO reset operation. FIFO overruns are indicated through a maskable interrupt and register bits. The synchronous interface provided to an external device (not shown) issues a TSOC signal to indicate to the Drop Side Interface 34 and FIFO 40 that the first word of the selected data structure is present on the TDAT bus. The TWRB signal cycles from low to high as sent by the external circuitry to tell the Interface 34 and FIFO 40 that the first word is coming. The external circuitry is then notified by issuance of a TCA signal that a cell may be written to the transmit FIFO 40 (cell available) on the rising edge of TWRB (transmit write strobe) which cycles at 25 MHz or lower. Once the cell is written to the FIFO 40, the FIFO 40 changes from cell available to cell unavailable status on write cell boundaries with timing aligned to the transmit write strobe (TWRB).

The Transmit Cell Processor 42 coupled to the output of the FIFO 40, inserts a cell offset indicator byte H4 which indicates the offset in bytes between itself, and the first cell boundary following the H4 byte. Processor 42 also provides rate adaptation via idle/unassigned cell insertion and HCS generation and insertion, and performs ATM cell scrambling. An idle or unassigned cell is transmitted if a complete ATM cell has not been written into the FIFO 40.

The Path Overhead Processor 44 has an input coupled to the output of the Cell Processor 42. The Transmit Path Overhead Processor (TPOP) 44 provides transport frame alignment generation, pointer generation, path overhead insertion, insertion of the synchronous payload envelope, insertion of path level alarm signals and a path bit interleaved parity calculation and insertion for performance monitoring.

The input to the Line Overhead Processor 48 is coupled to the output of the Path Overhead Processor 44. The Transmit Line Overhead Processor (TLOP) provides line level alarm insertion, and bit interleaved parity insertion using even parity.

Finally, the Transmit Section Overhead Processor (TSOP) 24 has an input coupled to the output of the Transmit Line Overhead Processor 48. The TSOP provides frame pattern insertion, scrambling, section level alarm signal insertion and bit interleaved parity insertion.

To the Transmit Line Overhead Processor 48 there is connected a Transmit Line Overhead Insert Port 50 which optionally inserts 81 bytes of transmit transport overhead from a data stream received serially at 5.184 Mbit/s from external sources. A Path Overhead Insert Port 46 is coupled to the Path Overhead Processor 44 and provides a bit serial path overhead interface to the Transmit Path Overhead Processor (TPOP) 44. Any, or all of the path overhead bytes may be sourced from, or modified by the bit serial path overhead stream.

Coupled to the output of the Line Overhead Processor 48 and to the input of the transmit circuit 18 is the section overhead processor 24 which provides frame pattern insertion, descrambling, section level alarm and performance monitoring. The output of the Section Overhead Processor 24 is also coupled to the Line Side Interface 52.

Cell Rate Decoupling

Figure 6:
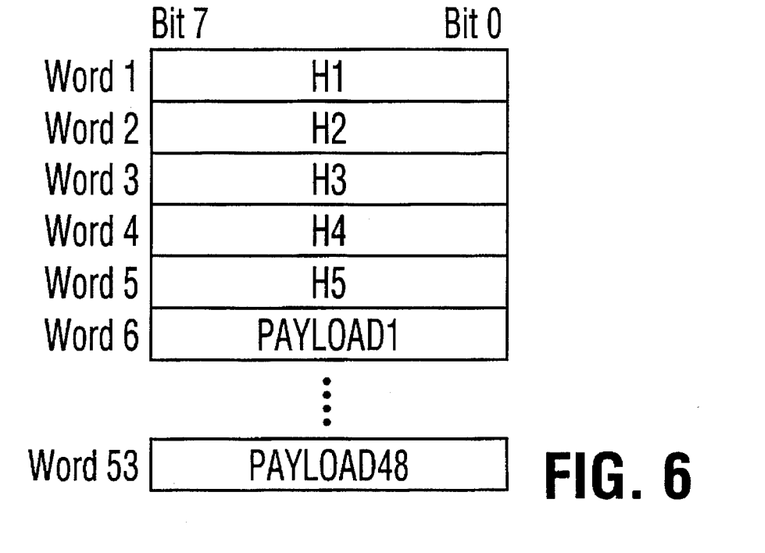
FIG. 6 is the 8 bit ATM cell data structure.

ATM cells may be passed to/from the drop line interface 34 using one of two defined data structures, namely, a 9-bit structure consisting of a start of a cell indication, and an 8-bit wide word as shown in FIG. 6. Here H1 to H5 are pointer bytes and a cell boundary offset byte. Words 6 to 53 contain the payload bytes.

Figure 7:
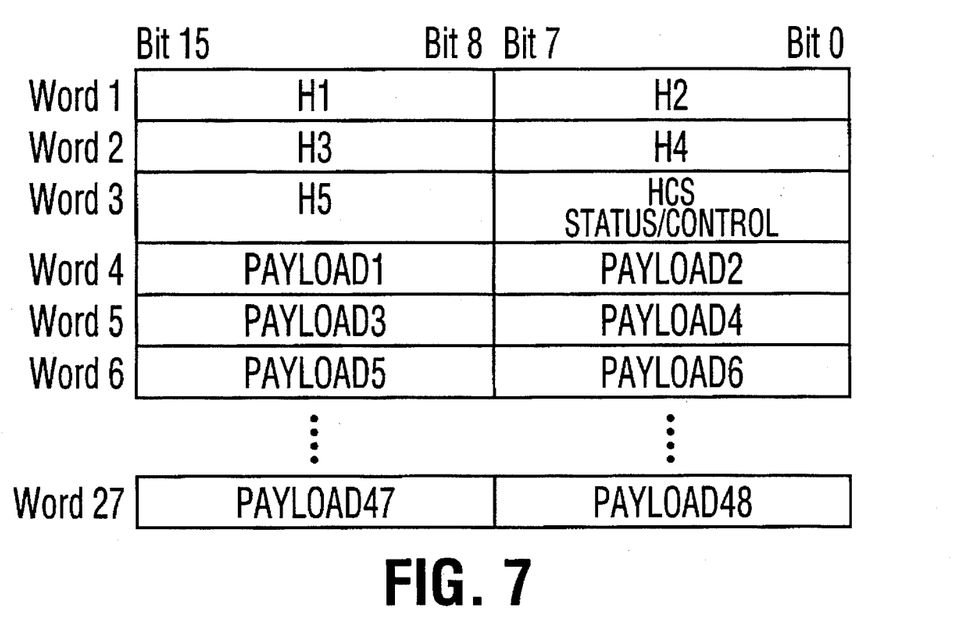
FIG. 7 is the 16 bit ATM cell data structure.

FIG. 7 shows the data structure for a 17-bit structure consisting of a start of cell indication, and a 16-bit wide word. Here the header includes a header check sequence octet.

Because the ATM cells are asynchronous whereas the SONET/SDH frames are sent at 155.52 Mbit/s, in order to go from one transmission mode to the other, it is necessary to decouple the timing for the data in one mode from that in the other.

In going from ATM to SONET/SDH, the ATM cells arrive at the transmit side of the Drop Side Interface 34 at irregular intervals. Consequently, a buffer must be used to temporarily store bytes so that they can then be read out from the buffer at a rate which is synchronized to the desired bit rate for SONET/SDH of 155.52 Mbit/s.

In this case, the buffer is a four cell transmit FIFO 40. ATM cells are stored in the transmit FIFO 40 after passing through the Drop Side Interface 34. The Drop Side Interface 34 first sends out a TCA signal to notify the external circuitry that a cell may be written to the transmit FIFO 40. To accomplish this, as shown in the timing diagram of FIG. 8, the TCA output transitions from 0 to 1 when the transmit FIFO 40 contains one empty cell. The transmit write strobe (TWRB) then cycles at 25 MHz or lower and data is then sampled on the rising edge of the TWRB cycles until a complete cell has been transferred. The process is then repeated.

Going from SONET/SDH to ATM, ATM cell boundaries must be located in the synchronous payload envelope of each frame, verified and the cells placed in the receive FIFO 32. These cells are then read out of the receive FIFO 32 to external ATM circuitry in response to an active receive read strobe signal from this external circuitry.

Figure 8:
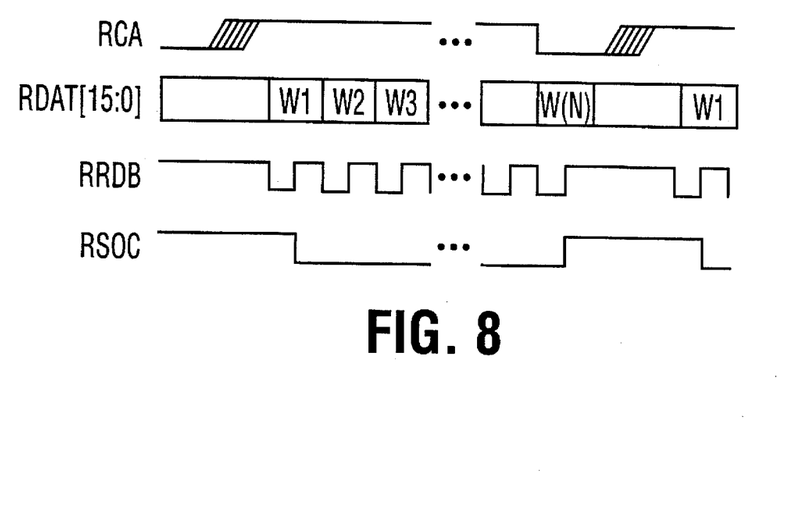
FIG. 8 is the timing diagram for the receive FIFO.

FIG. 8 shows the timing diagram for the receive FIFO 32. The RCA output transitions from 0 to 1 when a cell is available in the FIFO 32. Once read strobe signal RRDB begins to cycle, words are transmitted on each cycle of RRDB for at most 100 ns to avoid overrunning the FIFO 32. RSOC is high during the first word of the 27 word data structure.

Because in SONET or SDH a continuous stream of cells is transmitted in sequence, whereas in ATM the cell stream is non-continuous, transforming a non-continuous cell stream into a continuous one requires inserting idle or unassigned cells (cells containing no payload) during idle periods in the assigned cell stream. Consequently, in going from SONET to ATM it is necessary to recognize and discard these idle cells. This is done by simply testing the header pattern to determine if it is in the format for an unassigned cell. In the present case the first four octets or bytes in the header will each be 00H if the cell is idle or unassigned.

ATM Cell Delineation

Cell delineation is the process of framing to ATM cell boundaries using the header check sequence (HCS) field found in the cell header. The HCS is a cyclic redundancy check calculation over the first 4 octets of the ATM cell header (see FIG. 1). When performing delineation, correct HCS calculations are assumed to indicate cell boundaries. Cells must be byte aligned before insertion in the synchronous payload envelope. Thus, a cell delineation algorithm can search the 53 possible cell boundary candidates one at a time to determine a valid cell boundary location. While searching for the cell boundary location, the cell delineation circuit is in the HUNT state 60 shown in FIG. 9. When a correct HCS is found, a cell delineation state machine (not shown) locks on the particular cell boundary and enters the PRESYNC state 62. This state 62 validates the cell boundary location. If the cell boundary is invalid then an incorrect HCS will be received within the next DELTA cells, at which a transition back to the HUNT state 60 is executed. DELTA is a value to be selected. If no HCS errors are detected in this PRESYNC period 62 then the SYNC state 64 is entered. While in the SYNC state 64, synchronization is maintained until a ALPHA consecutive incorrect HCS patterns are detected, where ALPHA is a value to be selected. In such an event a transition is made back to the HUNT state 60 is executed. The values of ALPHA and DELTA determine the robustness of the delineation method. ALPHA determines the robustness against false misalignments due to bit errors. DELTA determines the robustness against false delineation in the synchronization process. ALPHA is chosen to be 7 and DELTA is chosen to be 6. These values result in a maximum average time to delineate of 31 microseconds.

Figure 9:
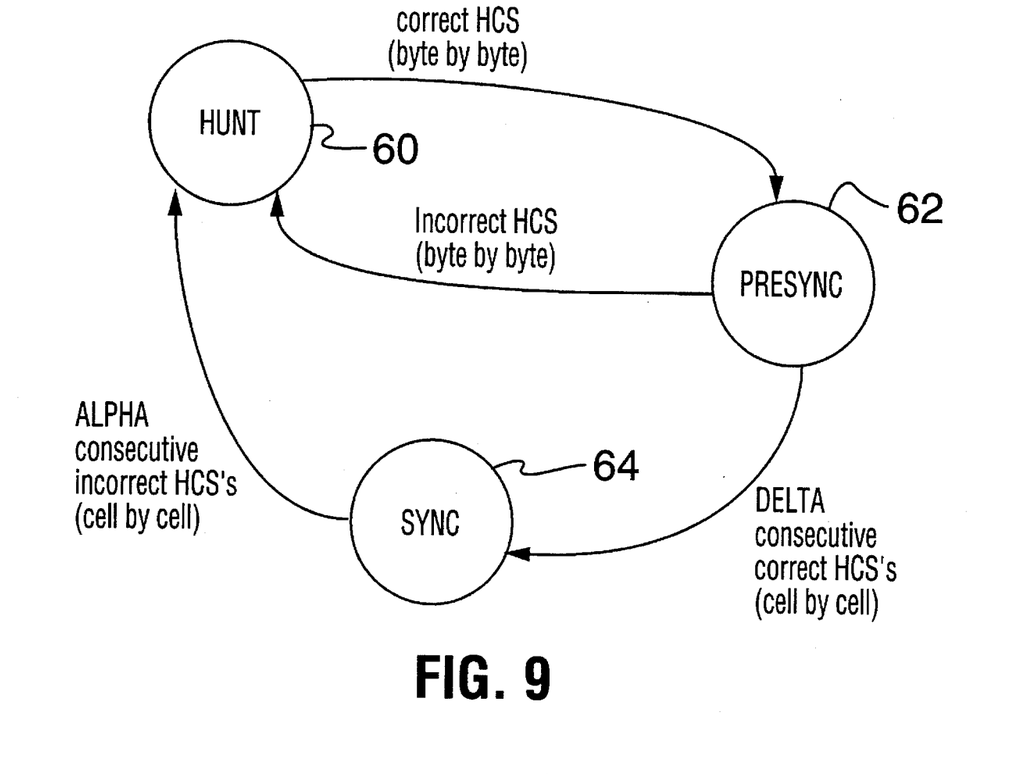
FIG. 9 is a schematic diagram showing states during delineation state diagram.
Figure 10:
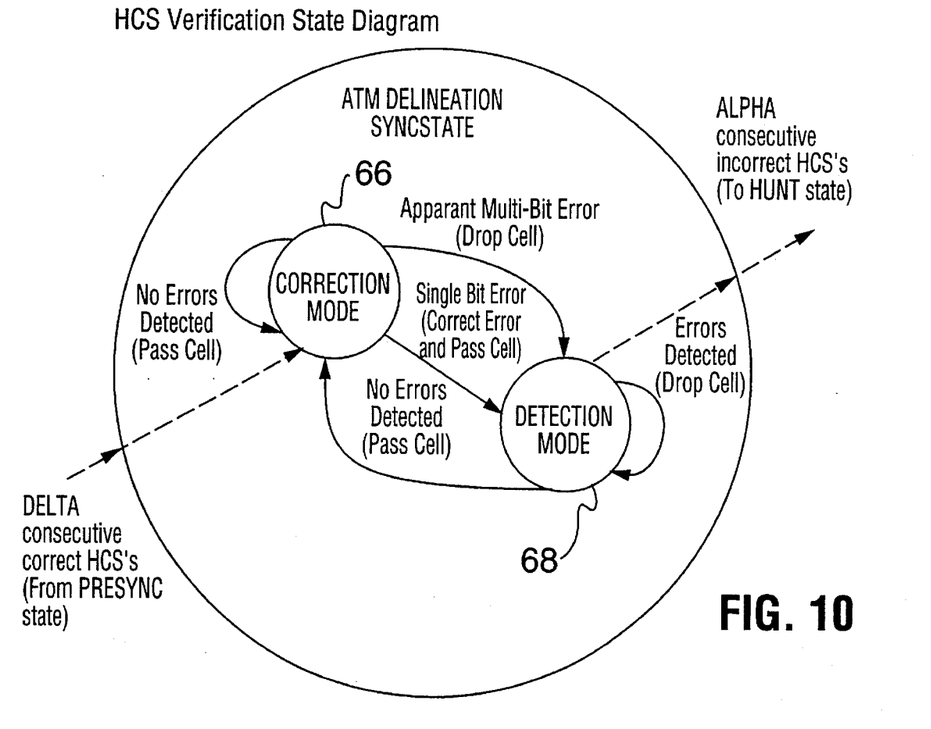
FIG. 10 is a schematic state diagram of the header check sequence verification process.

Cells are filtered based on HCS errors and/or a cell header pattern. Cell filtering is optional and is enabled through the registers of the Receive ATM cell Processor 30 (RACP). Cells are passed to the receive FIFO 32 while the cell delineation state machine is in the SYNC state 64 as described above. When both filtering and HCS checking are enabled, cells are dropped if uncorrectable HCS errors are detected, or if the corrected header contents match the pattern contained in the 'Match Header Pattern' and 'Match Header Mask' registers. Idle or unassigned cell filtering is accomplished by writing the appropriate cell header pattern into the 'Match Header Pattern' and 'Match Header Mask' registers. Idle/Unassigned cells are assumed to contain the all zeros pattern in the VCI and VPI fields. The 'Match Header Pattern' and 'Match Header Mask' registers allow filtering control over the contents of the GFC, PTI, and CLP fields of the header. The HCS is a cyclical redundancy check calculation over the first 4 octets of the ATM cell header. The RACP block verifies the received HCS using the polynomial, $x^8+x^2+x+1$. The coset polynomial, $x^6+x^4+x^2+1$ is added (modulo 2) to the received HCS octet before comparison with the calculated result. While the cell delineation state machine (referred to above) is in the SYNC state 64, the HCS verification circuit implements the state diagram shown in FIG. 7. In normal operation the HCS verification state machine remains in the 'Correction Mode' state 64. Incoming cells containing no HCS errors are passed to the receive FIFO 32 (of FIG. 5). Incoming single bit errors are corrected, and the resulting cell is passed to the FIFO 32. Upon detection of a single bit error or a multi bit error, the state machine transitions to the 'Detection Mode' state 68. In this state, the detection of any HCS error causes the corresponding cell to be dropped. Cells containing an error-free HCS are passed, and the state machine transitions back to the 'Correction Mode' state 66.

Overhead Access Port

The user network interface device 10 has transmit and receive overhead access ports 51 and 53, respectively. The receive overhead access port 53 includes a receive transport overhead extract port 54 and a receive path overhead extract port 56. The transport overhead extract port 54 extracts the 81 bytes of receive transport overhead and serializes them at 5.184 Mbits/s for optional external processing. A receive transport overhead frame position (RTOHFP) signal is used to locate the individual receive transport overhead bits in the transport overhead data stream. To this end the RTOHFP signal is logic one while bit 1 (the most significant bit) of the first framing byte (A1) is present in the receive transport overhead data stream.

The path overhead extract port 56 uses timing information from the synchronous payload envelope (SPE) block to extract, serialize and output the path overhead bytes on output receive path overhead data. The receive path overhead clock (RPOHCLK) is nominally a 576 kHz clock which provides timing to process the extracted receive path overhead. RPOHCLK is used to identify the most significant bit of the path trace byte (J1) on the receive path overhead data.

The transmit transport overhead insert port 50 optionally inserts the 81 bytes of transmit transport overhead from a data stream of transmit transport overhead data received serially at 5.184 Mbit/s. The transport overhead bytes include A1, A2, C1, E1, F1, D1–D3, K1, K2, D4–D12, Z1, Z2, and E2 and error masks B1, B2, H1, and H2. The transmit transport overhead frame position (TTOHFP) signal may be used to locate the individual transport overhead bits in the transport overhead data stream. TTOHFP is logic one while bit 1 (the most significant bit) of the first framing byte (A1) is expected in the transmit transport overhead data stream. An enable signal TTOHEN, is provided to allow per byte control of such optional transport overhead insertion.

The state of the TTOHEN input determines whether the data sampled on the transmit transport overhead data stream (TTOH), or the default overhead byte values shown in FIG. 8 are inserted in the STS-3c stream. For example, a high level on TTOHEN during the section user channel (F1) bit positions causes the eight values shifted in on TTOH to be inserted in the F1 byte position in the STS-3c stream. A low level on TTOHEN during the section sure channel bit positions causes the default value (0×00) to be inserted in the STS-3c stream. Other combinations are also possible.

During the Hi, H2, B1 and B2 byte positions in the TTOH stream, a high level on TTOHEN enables an error insertion mask. While the error mask is enabled, a high level on input TTOH causes the corresponding bit in the H1, H2, B1 or B2 byte to be inverted. A low level on TTOH causes the corresponding bit in the B1 or B2 byte to pass through the device uncorrupted.

The path overhead insert port 46 provides a bit serial path overhead interface to the transport path overhead processor 44. Any or all of the path overhead bytes may be sourced from, or modified by the bit serial path overhead stream, TPOH. The individual bits of each path overhead byte are shifted in using the transport path overhead clock output, TPOHCLK. The transport path overhead frame position signal, TPOHFP, output is provided to identify when the most significant bit of the path trace byte is expected on TPOH. The state of the transport path overhead enable, TPOHEN, input, together with an internal register, determines whether the data sampled on TPOH, or the default path overhead byte values are inserted in the STS-3c stream. For example, a high level on TPOHEN during the path trace (J1) bit positions causes the eight values shifted in on TPOH to be inserted in the J1 byte position in the STS-3c stream. A low level on TPOHEN during the path trace bit positions causes the default value (0×00) as shown in FIG. 9 to be inserted in the STS-3c stream. Other combinations are also possible.

During the B3 and H4 byte positions in the TPOH stream, a high level on TPOHEN enables an error insertion mask. While the error mask is enabled, a high level on input TPOH causes the corresponding bit in the B3 or H4 byte to be inverted. A low level on TPOH causes the corresponding bit in the B3 or H4 byte to pass through the TPOP uncorrupted.

Figure 11:
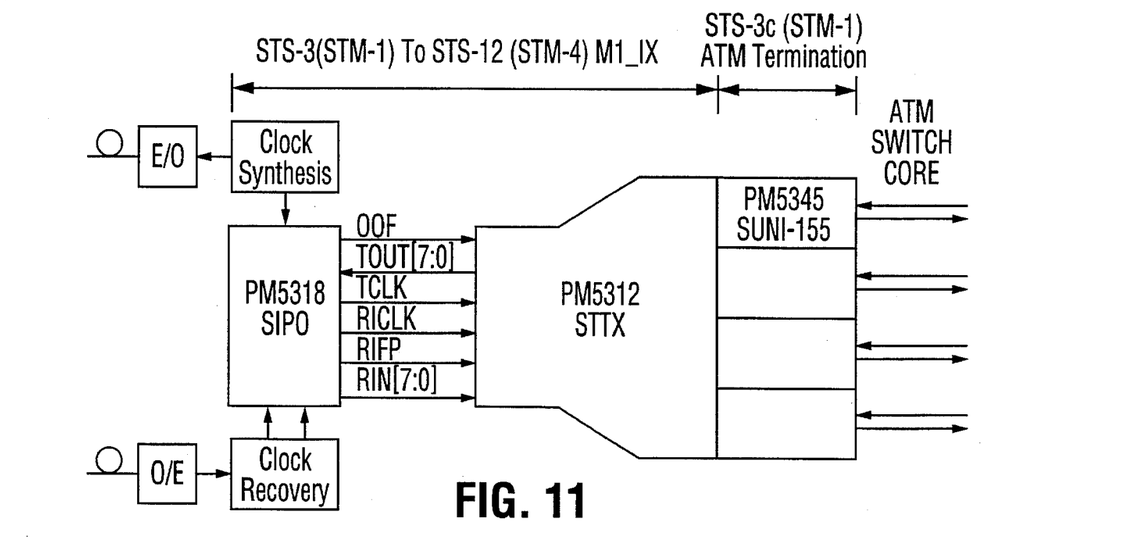
FIG. 11 is a schematic diagram showing four devices in accordance with a preferred embodiment of the invention being used with a multiplexer to produce a 622 Mbit/s SONET/SDH stream.

Referring to FIG. 11, there is shown a configuration in which four of the devices are used in parallel with four corresponding STS-3/STM-1 ATM streams to produce four synchronous SONET streams which are then multiplexed into a single STS-12/STM-4 stream at 622 Mbit/s.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

We claim:

1. A method of interfacing between an asynchronous stream of cells of data having a preset number of data bytes and a synchronous stream of frames of data with each frame having overhead and data bytes, comprising:
   (a) transforming an incoming asynchronous stream of cells of data into a synchronous stream of frames of said data by
      (i) storing received asynchronous cells of said data in a transmit FIFO;
      (ii) reading out stored cells of said data from said transmit FIFO as a transmitted stream of data;
      (iii) inserting an idle cell into the transmitted stream of data if a complete ATM cell has not previously been written into said transmit FIFO;
      (iv) mapping predetermined numbers of sequentially arriving cells into the payload portion of frames including inserting frame pattern bytes into the overhead of each of said frames; and
      (v) transmitting said frames synchronously; and
   (b) transforming an incoming synchronous stream of frames of data into an asynchronous stream of cells of said data by:
      (vi) performing frame synchronization upon incoming frames of said data;
      (vii) performing overhead processing and monitoring on said frames of data;
      (viii) performing cell delineation;
      (ix) transferring delineated cells to a receive FIFO; and
      (x) accessing said receive FIFO to read out cells stored therein.

2. A method according to claim 1, including scrambling data in each of said frames.

3. A method according to claim 1, including creating and inserting section, line, and path bit interleaved parity bytes in order to permit subsequent performance monitoring.

4. A method according to claim 1, wherein said buffer has a four cell receive and transmit buffers receive and transmit information, respectively, on a cell-by-cell basis.

5. A method according to claim 1, wherein said cells are transmitted in an asynchronous transfer mode.

6. A method according to claim 1, wherein said cells are mapped onto a synchronous optical network.

7. A method according to claim 1, including generating a payload pointer and inserting the synchronous payload envelope.

8. A method according to claim 7, wherein said cells are mapped contiguously in a synchronous payload envelope of each of said frames.

9. A user network interface device for interfacing between an asynchronous stream of ATM cells of data and a continuous stream of frames of data, comprising:
   a) means for temporarily storing received ATM cells in a receive first-in first-out buffer;
   (b) means for reading out cells from said receive first-in first-out buffer on a cell-by-cell basis;
   (c) means for generating and inserting idle cells into the cell stream of cells being read out when no complete cells have been written into the first-in first-out buffer during idle periods of the cell stream;
   (d) means for mapping, in order of arrival, cells from the storing means into a synchronous payload envelope of each frame of said frames of data; and
   (e) means for synchronously transmitting said frames of data; and (f) means for receiving synchronously transmitted frames of data, extracting the overhead and payload cells, and asynchronously transmitting the extracted cells;

wherein said means for mapping includes access ports which permit inserting overhead bytes from an external source.

10. A device according to claim 9, wherein said idle cell generating and inserting means includes an idle cell generator, registers programmed to insert header fields for the idle cell header and payload and means for calculating and inserting the header check sequence for an idle cell.

11. A device according to claim 9, including means for transforming an incoming continuous stream of frames of data into a non-continuous outgoing stream of cells of data by delineating and extracting cells from the frames and buffering and transmitting cells asynchronously.

12. A device according to claim 9, wherein means for synchronously transmitting includes:

(a) means for receiving frames of synchronously arriving data;

(b) means for stripping the transport and path overhead from the frames;

(c) means for delineating the cells in the synchronous payload envelope;

(d) means for extracting the cells;

(e) means for discarding idle cells;

(f) means for buffering the non-idle cells; and (g) means for transmitting non-idle cells in response to request signals from an external circuit.

13. A network user interface device for interfacing between a non-continuous stream of cells and a continuous stream of frames, comprising a transmitting section and a receiving section, wherein the transmitting section includes (a) means for storing incoming cells from a non-continuous stream of cells in a first-in first-out buffer;

(b) means for generating and inserting idle cells in idle periods of said incoming stream of cells so as to form a continuous stream of cells;

(c) means for mapping cells in said continuous stream of cells into a synchronous payload envelope of a frame;

(d) means for generating header information for said frames; and (e) means for transmitting synchronously said frames; and wherein the receiving section includes:

(f) means for receiving synchronous incoming frames;

(g) means for extracting the synchronous payload envelope and transport and path overhead from the frames;

(h) means for delineating cell boundaries of cells in from the synchronous payload envelope;

(i) means for filtering out idle cells from said cells and directing non-idle cells to a receive first-in first-out buffer; and (j) means for reading out cells from said receive FIFO buffer in response to requests from an external circuit.

14. A device according to claim 13, wherein said incoming cells are ATM.

15. A device according to claim 13, wherein the outgoing synchronous frames of data are SONET/SDH format.

16. A device for interfacing between a non-continuous stream of cells and a continuous stream of frames, comprising a transmitting section and a receiving section, the transmitting section having an input coupled to said non-continuous streams of cells and an output coupled to said continuous stream of frames, the receiving section having an input coupled to said continuous stream of frames and an output coupled to said non-continuous stream of cells, wherein the transmitting section includes a transport overhead access port coupled to a transmit line overhead processor operative to optionally insert into frames containing said cells to be transmitted bytes of transmit transport overhead obtained from an external source and the receiving section includes a receive overhead access port coupled to a receive line overhead processor, said receive line overhead processor being operative to extract received transport overhead data from said continuous stream of frames, serialize the extracted overhead data and make it available for outputting in response to appropriate control signals.

17. A device according to claim 16, including a path overhead access port coupled to a transmit path overhead processor operative to optionally insert into frames of cells to be transmitted bytes of transmit path overhead from a data stream of such data and said receive overhead access port being operative to extract from frames of incoming data path overhead data and having means for serially transmitting such data to an external circuit.

18. The method of claim 1, wherein the step of inserting an idle cell is performed after the step of reading out stored cells of said data from said transmit FIFO.

* * * * *

UNITED STATES PATENT AND TRADEMARK OFFICE
CERTIFICATE OF CORRECTION

PATENT NO. : 5,568,486
DATED : October 22, 1996
INVENTOR(S) : Huscroft et al.

It is certified that error appears in the above-indentified patent and that said Letters Patent is hereby corrected as shown below:

In claim 4, at column 12, lines 38 and 39, cancel "buffer has a four cell receive and transmit buffers", and insert --receive and transmit FIFOs--.

Signed and Sealed this

Eighteenth Day of March, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO : 5,568,486
DATED : October 22, 1996
INVENTOR(S) : Huscroft et al.

It is certified that error appears in the above-identified patent and that said Letters Patent is hereby corrected as shown below:

In the drawings,
In Figure 5, add a vertical line connecting elements 50 and 48; add a vertical line connecting elements 46 and 44; add a vertical line connecting elements 26 and 54; and add a vertical line connecting elements 28 and 56.

Signed and Sealed this

Eleventh Day of May, 1999

*Attest:*

Q. TODD DICKINSON

*Attesting Officer*  Acting Commissioner of Patents and Trademarks